United States Patent [19]

Hahn et al.

[11] Patent Number: 4,723,023

[45] Date of Patent: Feb. 2, 1988

[54] ISOINDOLINE DYES

[75] Inventors: Erwin Hahn, Heidelberg; Wolfgang Lotsch, Beindersheim; Reinhard Kemper, Heidelberg, all of Fed. Rep. of Germany

[73] Assignee: BASF Aktiengesellschaft, Lugwigshafen, Fed. Rep. of Germany

[21] Appl. No.: 876,427

[22] Filed: Jun. 20, 1986

[30] Foreign Application Priority Data

Jun. 26, 1985 [DE] Fed. Rep. of Germany ....... 3522741

[51] Int. Cl.$^4$ ............................................ C07D 209/44
[52] U.S. Cl. ..................................................... 548/482
[58] Field of Search ................................. 548/482, 470

[56] References Cited

U.S. PATENT DOCUMENTS 4,384,057  5/1983  von der Crone .................... 524/87
4,414,395  11/1983  Iqbal et al. ........................ 548/471
4,426,533  1/1984  Rochat et al. ..................... 548/471

FOREIGN PATENT DOCUMENTS 2041999  3/1972  Fed. Rep. of Germany ...... 548/482

Primary Examiner—Mary E. Ceperley

Attorney, Agent, or Firm—Oblon, Fisher, Spivak, McClelland, Maier

[57] ABSTRACT

Isoindoline dyes of the general formula

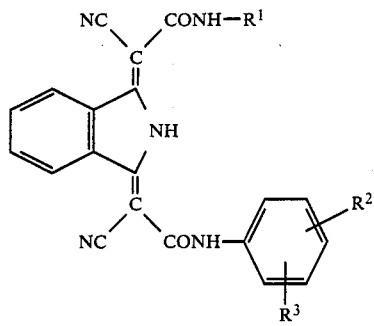

where $R^1$ is hydrogen, $C_1$-$C_4$-alkyl or benzyl and $R^2$ and $R^3$ independently of one another are each hydrogen, methyl, ethyl, methoxy, ethoxy, chlorine, bromine, fluorine, trifluoromethyl, methoxycarbonyl, ethoxycarbonyl or nitro, give pure brilliant deep yellow colorations with good lightfastness in surface coatings, printing inks and plastics.

13 Claims, No Drawings

ISOINDOLINE DYES

German Laid-Open Application DOS 2,041,999 discloses isoindoline compounds of the general formula

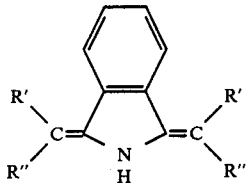

where R' is cyano, —COOR''' or —CO—R''' and R'' is carboxamide which is unsubstituted or substituted on the nitrogen by $C_1$–$C_3$-alkyl or aryl or is a heterocyclic radical,

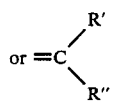

is a dioxotetrahydropyrimidine, dioxohexahydropyrimidine or dioxotetrahydroquinoline radical and R''' is $C_1$–$C_3$-alkyl. The dyes are pigments for coloring plastics, surface coatings and printing inks.

EP-A 19 588 describes isoindoline dyes of the formula

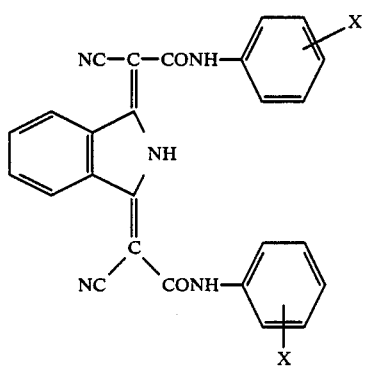

where X is a fluorine, chlorine or bromine atom in the 3- or 4-position, the dyes being used for pigmenting high molecular weight material. The colorations possess excellent lightfastness and fastness to weathering.

It is an object of the present invention to provide isoindoline dyes which possess better color strength and improved purity of shade compared with the prior art.

We have found that this object is achieved by isoindoline dyes of the general formula (I)

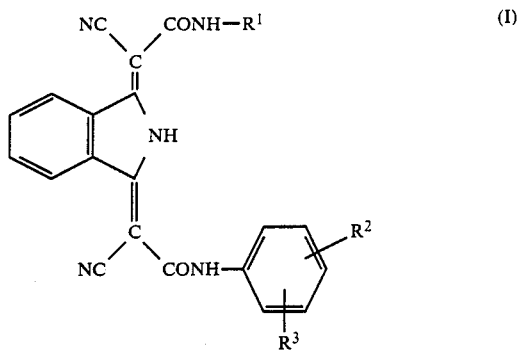

where $R^1$ is hydrogen, $C_1$–$C_4$-alkyl or benzyl and $R^2$ and $R^3$ independently of one another are each hydrogen, methyl, ethyl, methoxy, ethoxy, chlorine, bromine, fluorine, trifluoromethyl, methoxycarbonyl, ethoxycarbonyl or nitro.

In surface coatings, printing inks and plastics, the novel dyes give brilliant yellow colorations having good light fastness. For example, the dye (I), in which $R^1$, $R^2$ and $R^3$ are identical and are each hydrogen, is substantially superior in color strength and in purity of shade compared with the structurally similar dye of German Laid-Open Application DOS 2,041,999, Example 6

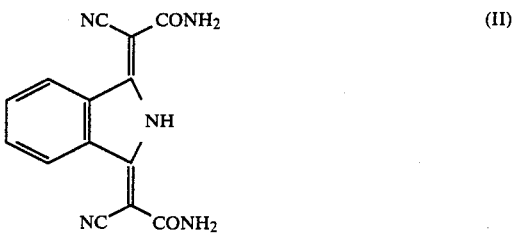

and the dye

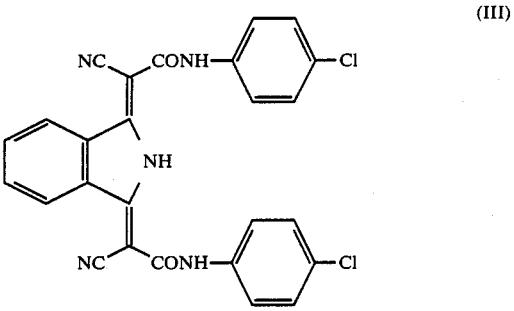

disclosed in EP-A 19 588, Example 1.

The dyes (I) are particularly advantageously used for pigmenting printing inks when the crude dyes obtained in the synthesis are converted to a finely divided form, for example by dry milling in a ball mill.

Preferred dyes of the formula (I) are those in which $R^1$ is hydrogen, methyl or ethyl, $R^2$ is hydrogen and $R^3$ is hydrogen, methyl, chlorine, fluorine, trifluoromethyl or carbomethoxy.

The dye of the formula (IV)

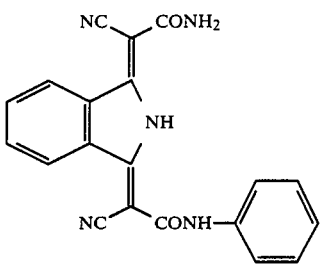 (IV)

is particularly preferred.

The dyes (I) are prepared by stepwise condensation of 1,3-diiminoisoindoline with an appropriate cyanoacetamide in a conventional manner.

The condensation of the diiminoisoindoline with the cyanoacetamide to give the semicondensation products can be carried out in water or in an organic solvent or diluent, for example an aliphatic alcohol of 1 to 4 carbon atoms, such as methanol, ethanol, isopropanol or butanol, a glycol or glycol ether, an open-chain or cyclic amide, such as dimethylformamide, dimethylacetamide or N-methylpyrrolidone, or in a mixture of the above-mentioned solvents. A slight excess of diiminoisoindoline may be advantageous. The amount of solvent or diluent is not critical, the amount used being sufficient to ensure that the reaction mixture is stirrable before, during and after the reaction. The reaction is carried out as a rule at below 100° C.

The condensation of the semicondensation products with the second molecule of cyanoacetamide to give the dyes of the formula (I) is carried out in an aliphatic mono- or dicarboxylic acid, in particular in an aliphatic monocarboxylic acid, such as acetic acid or propionic acid, at from 50° to 150° C.

Both the semicondensation products and the pigments of the formula (I) are precipitated at elevated temperatures and can be isolated in pure form by filtration and, if necessary, washing with an organic solvent.

By means of a suitable reaction procedure, it is also possible to carry out the two reaction steps in the same reaction vessel, without intermediate isolation of the semicondensation products.

The resulting dyes can be used in general in the form in which they are obtained in the reaction.

Advantageously, however, the crude dyes obtained in coarse crystalline form in the synthesis are comminuted to a particle size of $\leq 0.2$ μm by milling in the absence of assistants.

Comminution can be effected in a planetary ball mill, a vibratory mill, a ball mill or a stirred ball mill, preferably in a ball mill using ceramic balls. Depending on the mill, the grinding medium and the mill charge, the milling process takes from 2 to 70 hours before the mill base has a mean primary particle size of less than 0.2 μm, preferably 0.1 μm or smaller. The mill base is in the form of agglomerates composed of the primary particles.

The mill base can be used directly for pigmenting printing inks.

The Examples which follow illustrate the invention. Parts are by weight.

EXAMPLE 1

(a) 21 parts of monoadduct of ethylene glycol with diiminoisoindoline and 9 parts of cyanoacetamide in 150 parts of methanol are stirred for 5 hours at 40° C., the mixture is cooled and then filtered, and the residue is washed with methanol and dried. 19 parts of the monocondensate of the formula (V)

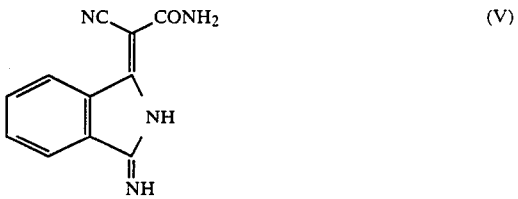 (V)

are obtained.

(b) 21 parts of the monocondensate (V) and 16 parts of N-phenylcyanoacetamide in 500 parts of glacial acetic acid are heated at the boil for 5 hours. The mixture is cooled to 60° C. and then filtered, and the residue is washed first with glacial acetic acid and then with methanol and is dried. Yield: 30 parts of the dye of the formula (IV). The dye is incorporated into a baking finish and gives lightfast colorations with a brilliant, neutral yellow hue.

(c) 50 parts of dye (IV) [from (b)] are milled in a planetary ball mill with 20 agate balls of 1 cm diameter and 20 agate balls of 2 cm diameter for 4 hours. The greenish yellow mill base has a crystalline size of less than 0.1 μm according to the electron micrographs and, when used in NC printing inks, gives very deep prints which have a neutral yellow hue and good lighfastness.

EXAMPLE 2

The procedure described in Example 1 (a), (b) and (c) is followed, except that a cyanoacetamide of the formula $NC-CH_2-CONH-R^1$ is used in the first stage, instead of cyanoacetamide, and the N-phenylcyanoacetamide of the formula

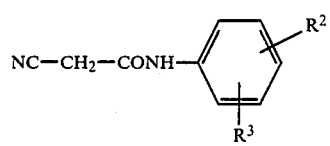

is used in the second stage.

The meanings of $R^1$ and

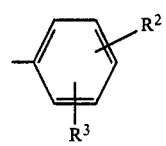

are given in the Table below.

The resulting yellow pigments have properties which are similar to those of the dye obtained as described in Example 1 b or 1 c. The pigments give colorations having the hues indicated in column 4.

| Example | $R^1$ | Ar ($R^2$, $R^3$ substituted phenyl) | Hue |
|---|---|---|---|
| 2 | H | 4-Cl | reddish yellow |
| 3 | H | 2-CH$_3$ | greenish yellow |
| 4 | H | 4-CH$_3$ | reddish yellow |
| 5 | H | 3-CH$_3$ | neutral yellow |
| 6 | H | 3-Cl | neutral yellow |
| 7 | H | 4-CF$_3$ | greenish yellow |
| 8 | H | 3-CO$_2$CH$_3$ | greenish yellow |
| 9 | H | 3,4-di-Cl | reddish yellow |
| 10 | H | 3-OCH$_3$ | reddish yellow |
| 11 | H | 2-CH$_3$, 4-Cl | reddish yellow |
| 12 | CH$_3$ | phenyl | neutral yellow |
| 13 | CH$_3$ | 3,4-di-Cl | reddish yellow |
| 14 | CH$_3$ | 2-CH$_3$ | reddish yellow |
| 15 | CH$_3$ | 3-CH$_3$ | reddish yellow |
| 16 | CH$_3$ | 4-CH$_3$ | orange |
| 17 | CH$_3$ | 3-Cl | greenish yellow |
| 18 | C$_2$H$_5$ | phenyl | reddish yellow |
| 19 | C$_2$H$_5$ | 3-CH$_3$ | neutral yellow |
| 20 | C$_2$H$_5$ | 3-Cl | neutral yellow |
| 21 | C$_2$H$_5$ | 3-CO$_2$CH$_3$ | greenish yellow |

-continued

| Example | R¹ | 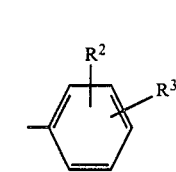 | Hue |
|---|---|---|---|
| 22 | 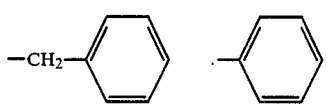 | | neutral yellow |
| 23 | 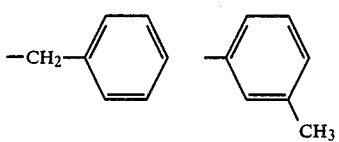 | | orange |
| 24 | 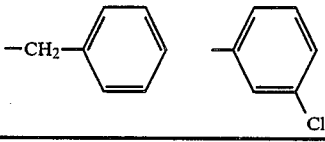 | | greenish yellow |

We claim:

1. An isoindoline dye of the formula:

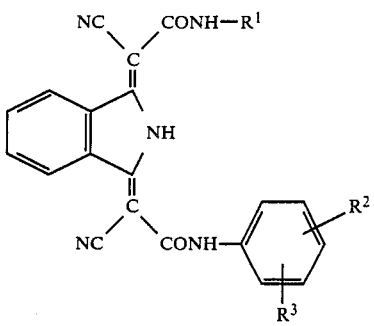

wherein R¹ is hydrogen, methyl or ethyl, R² is hydrogen and R³ is hydrogen, methyl, chlorine, fluorine, trifluoromethyl, or carbomethoxy.

2. The isoindoline dye of claim 1, wherein R¹, R², and R³ are each hydrogen.

3. The isoindoline dye of claim 1, wherein R¹ and R² are each hydrogen and R³ is chlorine.

4. The isoindoline dye of claim 1, wherein R¹ and R² are each hydrogen and R³ is methyl.

5. The isoindoline dye of claim 1, wherein R¹ and R² are each hydrogen and R³ is trifluoromethyl.

6. The isoindoline dye of claim 1, wherein R¹ and R² are each hydrogen and R³ is carbomethoxy.

7. The isoindoline dye of claim 1, wherein R¹ is methyl, R² is hydrogen and R³ is methyl.

8. The isoindoline dye of claim 1, wherein R¹ is methyl, R² is hydrogen and R³ is chlorine.

9. The isoindoline dye of claim 1, wherein R¹ is methyl and R² and R³ are each hydrogen.

10. The isoindoline dye of claim 1, wherein R¹ is ethyl and R² and R³ are each hydrogen.

11. The isoindoline dye of claim 1, wherein R¹ is ethyl, R² is hydrogen and R³ is methyl.

12. The isoindoline dye of claim 1, wherein R¹ is ethyl, R² is hydrogen and R³ is chlorine.

13. The isoindoline dye of claim 1, wherein R¹ is ethyl, R² is hydrogen and R³ is carbomethoxy.

* * * * *